United States Patent [19]

Kanamaru et al.

[11] 4,413,717

[45] Nov. 8, 1983

[54] ELECTROMAGNETIC CLUTCH AND METHOD OF MANUFACTURE

[75] Inventors: Hisanobu Kanamaru, Katsuta; Hideo Tatsumi, Mito; Kosaku Sayo, Katsuta; Moisei Okabe, Hitachi, all of Japan

[73] Assignee: Hitachi, Ltd., Tokyo, Japan

[21] Appl. No.: 278,728

[22] Filed: Jun. 29, 1981

Related U.S. Application Data

[62] Division of Ser. No. 20,316, Mar. 14, 1979, Pat. No. 4,305,198.

[30] Foreign Application Priority Data

Mar. 27, 1978 [JP] Japan .................................. 53-34193

[51] Int. Cl.³ ...................... F16D 27/10; F16D 27/14
[52] U.S. Cl. .............................. 192/84 C; 192/107 M; 403/274
[58] Field of Search ............................ 29/520, 522 R; 192/84 C, 84 B, 107 M; 403/274, 278, 280

[56] References Cited

U.S. PATENT DOCUMENTS

| | | | |
|---|---|---|---|
| 2,038,124 | 4/1936 | Osborne | 29/520 |
| 2,267,114 | 12/1941 | Lear et al. | 192/84 C X |
| 2,804,679 | 9/1957 | Tracy | 29/522 X |
| 2,857,998 | 10/1958 | Harter | 192/84 C |
| 3,529,856 | 9/1970 | Smith et al. | 29/520 X |
| 3,559,946 | 2/1971 | Baxter | 29/521 X |
| 3,641,865 | 2/1972 | Swindt et al. | 29/523 X |
| 3,837,755 | 9/1974 | Benoit et al. | 403/274 |
| 4,010,832 | 3/1977 | Puro | 192/84 C |
| 4,079,821 | 3/1978 | Miller | 192/84 C |
| 4,090,161 | 5/1978 | Fuhrer et al. | 192/84 C X |
| 4,126,215 | 11/1978 | Puro | 192/84 C |
| 4,150,738 | 4/1979 | Sayo et al. | 192/84 C |
| 4,189,042 | 2/1980 | Miller | 192/84 C |

FOREIGN PATENT DOCUMENTS

| | | | |
|---|---|---|---|
| 702470 | 1/1965 | Canada | 192/84 C |
| 1495815 | 12/1977 | United Kingdom . | |

*Primary Examiner*—Rodney H. Bonck
*Attorney, Agent, or Firm*—Antonelli, Terry & Wands

[57] ABSTRACT

An electromagnetic clutch includes a pair of rotatable driving and driven members adapted to be electromagnetically coupled together and uncoupled from each other. At least one of the driving and driven members comprises a pair of concentric annular members both made of magnetizable material and having opposed and radially spaced peripheral surfaces in which annular grooves are formed, respectively. An annular bond member of a non-magnetizable material is swaged into the annular space between the annular magnetizable members and thus into the annular grooves to mechanically connect the magnetizable members as well as to magnetically disconnect them from each other.

5 Claims, 23 Drawing Figures

F I G. 16
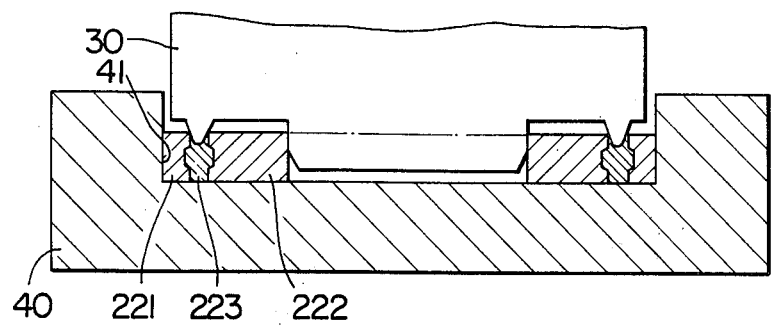
F I G. 17
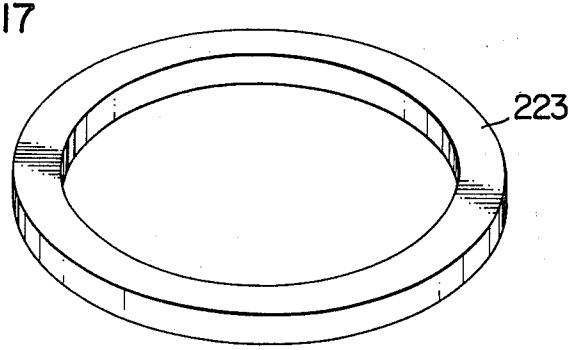
F I G. 18
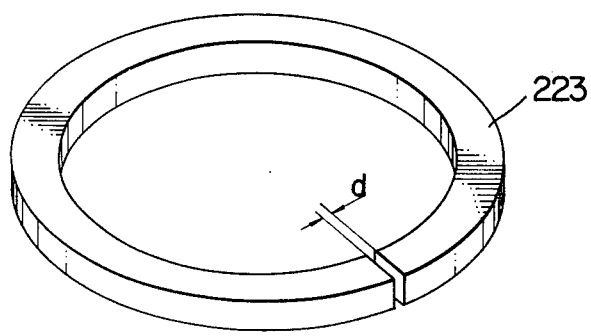

PRESENT INVENTION

ELECTROMAGNETIC CLUTCH AND METHOD OF MANUFACTURE

This is a division of application Ser. No. 020,316, filed Mar. 14, 1979 and now U.S. Pat. No. 4,305,198.

BACKGROUND OF THE INVENTION

1. Field of the Invention

The present invention relates to an electromagnetic clutch and a method of the manufacture thereof and, more particularly, but not restrictively, to an electromagnetic clutch for use in an air conditioner for an automobile and to a method of manufacturing the electromagnetic clutch.

2. Description of the Prior Art

An electromagnetic clutch includes driving and driven rotary members or so-called "rotor discs" which are electromagnetically coupled together or uncoupled from each other. The prior art disc of a first type is formed of an annular material punched out from a sheet of steel. The disc includes radially sectionalized first, second and third zones or sections disposed in concentric relationship with each other and radially sectionalized or separated by outer and inner circular rows of openings. The openings in each row are circumferentially spaced to leave in the disc four radial bridges which mechanically interconnect the radially adjacent pair of sectionalized zones.

With the prior art rotor disc of the type referred to above, the magnetic flux passes also through the ineffective bridges with a resultant decrease in the effective flux. For this reason, the prior art electromagnetic clutch which incorporates the rotor discs of the type discussed must be of a large or bulky size.

A second type of the prior art rotor disc is formed of concentric and radially spaced first and second annular members both of a magnetizable material having radially opposed peripheral surfaces in which grooves are formed. The first and second annular magnetizable members are mechanically bonded together by three circumferentially spaced bond members of a non-magnetizable metal swaged into the annular space defined between the first and second magnetizable members. Each of the bond members when swaged is pressed in the axial direction of the disc to cause a plastic deformation so that the material of the bond member flows into the grooves. This bonding method, however, fails to provide adequate mechanical strengths and a mechanical stability for the reason to be discussed later.

As such, the first and second types of the prior art discs are not satisfactory in the view points of leakage flux and mechanical strengths.

U.S. Pat. No. 2,038,124 issued Apr. 21, 1936 to John L. Osborne teaches a method of mechanically connecting two radially spaced and concentric members by means of an insert or mechanical bond member swaged into the annular space defined between the two concentric members. U.S. Pat. No. 2,804,679 issued Sept. 3, 1957 to Ward D. Tracy and U.S. Pat. No. 3,559,946 issued Feb. 2, 1971 to David W. Baxter, Jr. contain similar teachings. These three U.S. patents, however, are not concerned with electromagnetic clutches.

SUMMARY OF THE INVENTION

It is an object of the present invention to provide an improved electromagnetic clutch with a minimized leakage flux and an improved mechanical stability.

It is another object of the present invention to provide a method of manufacturing an improved electromagnetic clutch of the class discussed above.

According to one feature of the present invention, there is provided an improved electromagnetic clutch including first and second rotatable members disposed in substantially coaxial relationship, said first rotatable member being drivingly connected to a driven member and including a section made of a magnetizable material, said second rotatable member including a section made of a magnetizable material and provided with means for drivingly connecting said second rotatable member to a driving means; means including said sections of said first and second rotatable members for forming a magnetic circuit; and an electromagnetic coil means for generating a magnetic flux passing through said magnetic circuit; wherein at least one of said first and second rotatable members comprises substantially concentric and radially spaced annular members both made of a magnetizable material, and an annular bond member of a non-magnetizable material swaged into the annular space between said concentric magnetizable members to mechanically connect them together and magnetically disconnect them from each other.

According to another feature of the present invention, there is provided a method of making an electromagnetic clutch of the type which includes first and second rotatable members disposed in substantially coaxial relationship, said first rotatable member being drivingly connected to a driven member and including a section made of a magnetizable material, said second rotatable member including a section made of a magnetizable material and provided with means for drivingly connecting said second rotatable member to a driving means; means including said sections of said first and second rotatable members for forming a magnetic circuit; and an electromagnetic coil means for generating a magnetic flux passing through said magnetic circuit; at least one of said first and second rotatable members comprising substantially concentric annular members both made of a magnetizable material;

wherein said at least one rotatable member is produced by the steps of;

providing an annular space between the inner and outer peripheral surface of the radially outer and inner annular members;

forming annular grooves in said inner and outer peripheral surfaces of said inner and outer annular members, respectively;

preparing a generally ring-shaped bond member of a non-magnetizable metallic material having predetermined mechanical strengths and a deformation resistance smaller than that of the magnetizable material from which said annular members are made, said bond member being of a simple cross-section having a height substantially equal or close to the height of said annular space;

introducing said bond member into said annular space to form an assembly of said annular magnetizable members and said bond members;

placing pressure application members relative to said assembly so that said bond member is substantially wholly surrounded by said annular magnetizable members and by said pressure application members, at least one of said pressure application members having an annular projection directed toward said bond member;

forcing said projection into said annular space to cause a plastic flow of the bond material to substantially all the points of said annular space and into said annular grooves whereby said bond member mechanically bonds said annular members together by shearing and gripping forces.

The above and other objects, features and advantages of the present invention will be made more apparent by the following description with reference to the accompanying drawings.

BRIEF DESCRIPTION OF THE DRAWINGS

FIGS. 3 to 9 illustrate respective steps of a method of mechanically bonding two members and a mechanical bond obtained, wherein;

FIG. 3 illustrates in fragmentary perspective view the two members and a bond member before they are bonded together;

FIG. 4 graphically illustrates the relationship between an angle of inclination of side faces of grooves formed in opposed surfaces of the two members to be bonded together and an axial shearing breaking strength of the mechanical bond thus obtained;

FIG. 5 illustrates in perspective view the two members to be bonded and the bond member introduced in a space defined between the two members to be bonded;

FIG. 6 illustrates the bond member when it is swaged by means of pressure application members;

FIG. 7 diagrammatically illustrates the condition for the swaging operation;

FIG. 8 graphically illustrates the relationship between the depth of the insertion of a pressure application member at the time of swaging operation, the torque transmitted by a disc plate obtained and the axial shearing breaking strength of the mechanical bond produced by the swaging operation;

FIG. 9 illustrates in perspective view the two members and the bond member when the swaging operation has been finished;

FIG. 16 illustrates a support for backing up a thin-walled member to be bonded to another member;

FIGS. 17 and 18 are perspective views of examples of annular or ring-shaped bond members used in the method according to the present invention;

DESCRIPTION OF PREFERRED EMBODIMENTS

Figure 1:
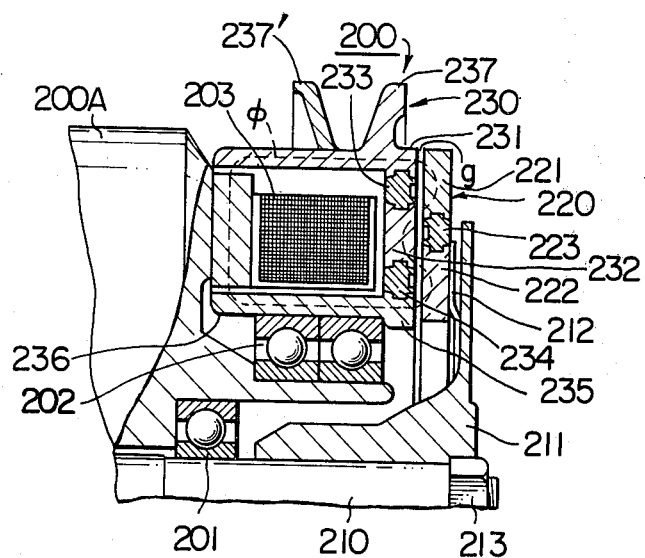
FIG. 1 is a partly sectional fragmentary view of an embodiment of an electromagnetic clutch according to the present invention.
Figure 2:
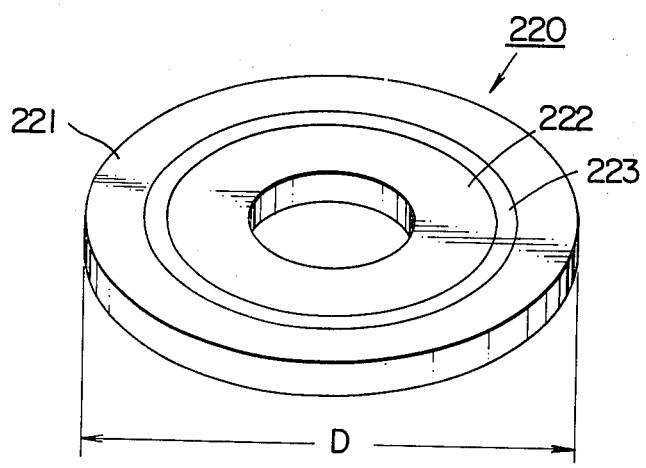
FIG. 2 is a perspective view of a disc of the clutch shown in FIG. 1.

Hereinafter, preferred embodiments of the invention will be described with reference to the accompanying drawings. Referring first to FIG. 1 showing in section a half of an embodiment of an electromagnetic clutch in accordance with the invention, the electromagnetic clutch is generally designated by numeral 200 and shown as being attached to a body 200A of a compressor of an air conditioner for an automobile. The electromagnetic clutch 200 has a hub 211 fixed by means of a nut 213 to a shaft 210 of the compressor. The shaft 210 is journaled by a bearing 201. A disc generally denoted by numeral 220 is drivingly connected to the hub 211 through spring fingers one of which is shown at 212. The disc 220 is rotatable with the hub 211 but movable relative to the hub 11 in the axial direction. As will be seen from FIG. 2, the disc 220 comprises concentric annular members or so-called "disc plates" 221 and 222 both made of a magnetizable material, such as steel, and a mechanical bond member 223 made of a non-magnetic material such as copper, brass, high tensile aluminum or the like.

A rotor 230 is mounted on the body 200A of the compressor through bearings 202. According to the invention, the rotor 230 is composed of three concentric annular members or so-called "disc plates" 231, 232 and 235 all made of a magnetizable material, such as steel, and mechanical bond members 233 and 234 made of a nonmagnetizable material, such as brass. A cylindrical rotor hub 236 and a pulley 237 are formed integral with the disc plate 235 and 231, respectively. The left-hand side wall 237' of the pulley 237 is connected by welding. A belt (not shown) is adapted to be engaged with the pulley 237 to transmit torque from an automobile engine to the pulley 237, thereby to drive the compressor 200A.

An electromagnetic coil 203 is constituted by a yoke and a coil and is directly secured to the body 200A of the compressor.

In operation, when the electromagnetic clutch 200 is not electrically energized, only the rotor 230 is driven by the torque of the engine which is transmitted through the pulley 237, while the disc 220, which is spaced by a gap g from the rotor 230, and hence the hub 211 and the shaft 210 are kept stationary. When the electromagnetic coil 203 is electrically energized, a magnetic flux $\phi$ is generated and flows along a path shown by a broken line, i.e. via the yoke of the electromagnetic coil 203, pulley 237, disc plate 231, gap g, disc plate 221, gap g, disc plate 232, gap g, disc plate 222, gap g, disc plate 235 and the rotor hub 236. Due to the presence of the magnetic flux $\phi$, the disc 220 is electromagnetically attracted by and connected to the rotor 230 and is rotated therewith. This rotation is transmitted to the shaft 210 through the spring fingers 212 and the hub 211 so that the shaft 210 is rotated in synchronization with the rotor 230.

It is to be noted that the mechanical bond members 223, 233 and 234 provide mechanical strengths sufficiently high enough to withstand the torque to be transmitted. In addition, the bond members are made of a non-magnetizable material with magnetically insulating characteristics and thus effectively minimize the leak of the magnetic flux.

A method of connecting the disc plates will be described in detail hereinunder with reference to FIG. 3 and following drawings. For the simplification purpose, the description is made only with respect to a method of making the disc 220. Needless to say, however, the method of making the disc 220 can be applied also to the rotor 230.

Figure 3:
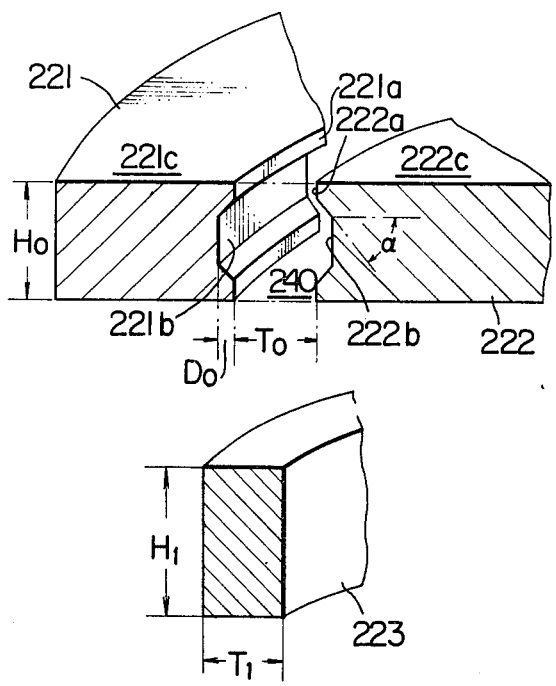

Referring to FIG. 3, an annular space 240 having a width To and a height Ho is defined between the surface 221a of the first disc plate 221 and the surface 222a of the second disc plate 222. The surfaces 221a and 222a are formed therein with circumferential grooves 221b and 222b which extend in parallel with the end surfaces 221c and 222c of respective disc plates 221 and 222. The depths Do of these grooves are preferably from 0.1 to 1.0 mm and, more preferably, from 0.2 to 0.6 mm.

Figure 4:
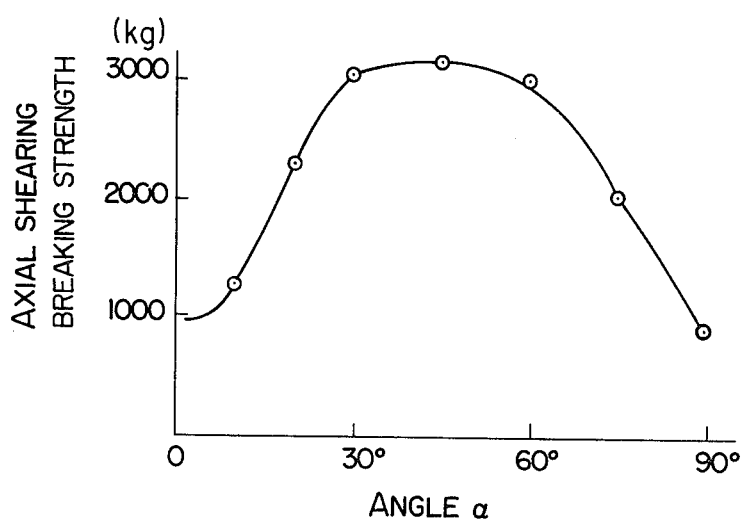

The angle of inclination α of the side walls of each groove largely affects the plastic flow of the bond member 223 into these grooves and, accordingly, the connecting or coupling strength between the first and the second disc plates 221 and 222. FIG. 4 shows the relationship between the angle of inclination α of the side walls of the grooves and the axial shearing breaking strength of the mechanical bond between two disc plates. The angle of inclination α is selected to fall within a range of between 25° and 65° and, preferably, between 30° and 60°.

The mechanical bond member 223 is made of a material which has a higher plastic deformation and thus a lower deformation resistance than the material from which the disc plates 221 and 222 are made. The bond member 223 has a ring-like shape. The width $T_1$ of the bond member 223 is substantially equal to or somewhat smaller than the width To of the aforementioned space 240 between the two disc plates, while the height $H_1$ of the bond member 223 is substantially equal to or somewhat larger than the height Ho of the space 240.

For a reason which will be discussed later, the difference ΔH (See FIG. 5) between the heights $H_1$ and Ho should be as small as possible and preferably maintained in the order of, for example, 0.2 to 0.3 mm in the situation where the height $H_1$ is greater than the height Ho. The bond member 223 can have any various simple cross-sectional shapes other than the illustrated rectangular shape, e.g., circular, eliptic, polygonal cross-sectional shape, etc. Since the bond member 233 is designed to be subjected to plastic deformation after the insertion into the space 240, the cross-sectional shape of the bond member before it is deformed can be selected irrespective of the shape of the space 240.

Figure 5:
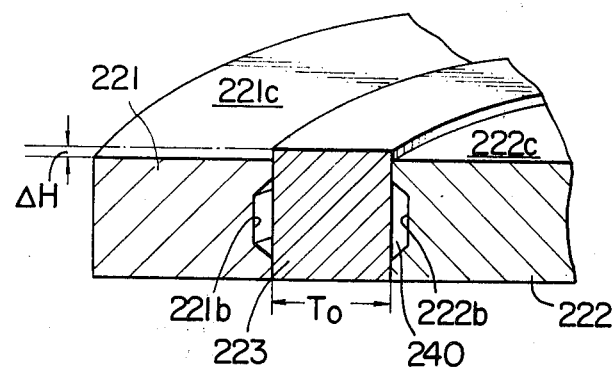

In connecting the disc plates 221 and 222 to each other by means of the bond member 223, the latter is inserted into the annular space 240 defined between these disc plates 221 and 222, as shown in FIG. 5, to form an assembly. Subsequently, this assembly is placed on an anvil 40. The bond member 223 is then pressed by a pressing portion 32 of a pressing member 30 having an end surface 31 of a width smaller than the width To of the space 240. As a result, a plastic flow of the bond material 223 is caused so that the material of the bond member is swaged or upset into the grooves 221b and 222b. The above-mentioned step of insertion of the bond member as shown in FIG. 5 may be carried out with the aid of the pressing member 30.

Figure 6:
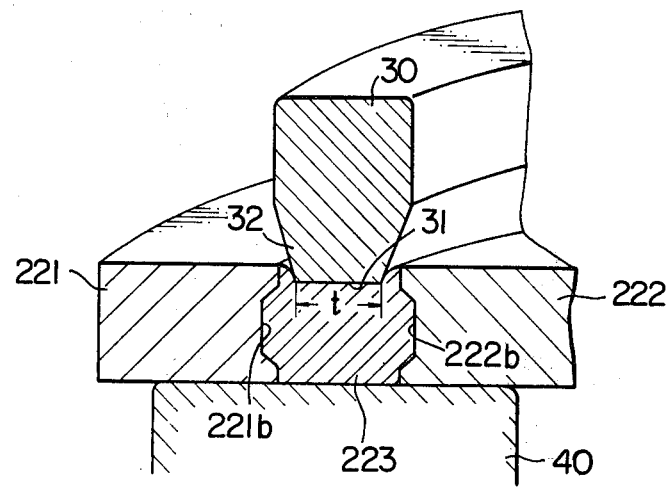

In the position shown in FIG. 5, the bond member 223 is surrounded by the disc plates 221 and 222 except the axial end faces which are to be engaged by the pressing member 30 and the anvil 40. The difference ΔH ($H_1$−Ho) is of very minor dimension. Thus, it is reasonable to say that the insert is wholly enclosed and confined by the disc plates 221 and 222 and by the pressing member 30 and the anvil 40 at the moment just before the initiation of pressing operation by the pressing member 30. Therefore, as shown in FIG. 6, the material of the bond member 223 hardly flows out of the space 240 while the member 223 is being pressed by the pressing member 30.

Figure 7:
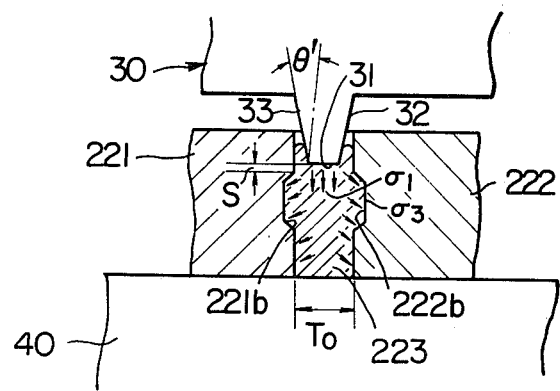

As will be seen in FIG. 7, the side faces 33 of the pressing portion 32 of the pressing member 30 are inclined at an angle θ' to a plane perpendicular to the end surface 31, i.e. to the direction of insertion. This angle of inclination θ' is preferably within the range of between 3° and 15°. This is because a pressing member having a too small angle of inclination θ40 cannot be easily extracted from the bonding material 223 after swaging. With a too large angle of inclination θ', the material of the bond member 223 tends to flow in the direction opposite to the direction of the driving of the pressing member 30, i.e. to the outside of the space 240. In addition, a too large angle of the inclination θ' cannot assure the insertion of the pressing member to a substantial depth, resulting in an insufficient internal stress generated in the bond member and, accordingly, an insufficient mechanical bonding between the two disc plates 221 and 222.

It is preferred that the distance S between the end surface 31 of the pressing projection 32 of the pressing member 30 and the upper ends of the grooves 221b and 222b of the disc plate is made as small as possible, as shown in FIG. 7. In other words, it is preferred that the pressing projection 32 is driven into the bond member 223 as deep as possible so that the end surface 31 is positioned as close to the upper edges of the grooves 221 and 222b as possible. By so doing, it is assured that the frictional resistance caused by the plastic flow of the material of the bond member 223 is reduced, so that the material of the bond member can surely be swaged into the grooves.

Figure 8:
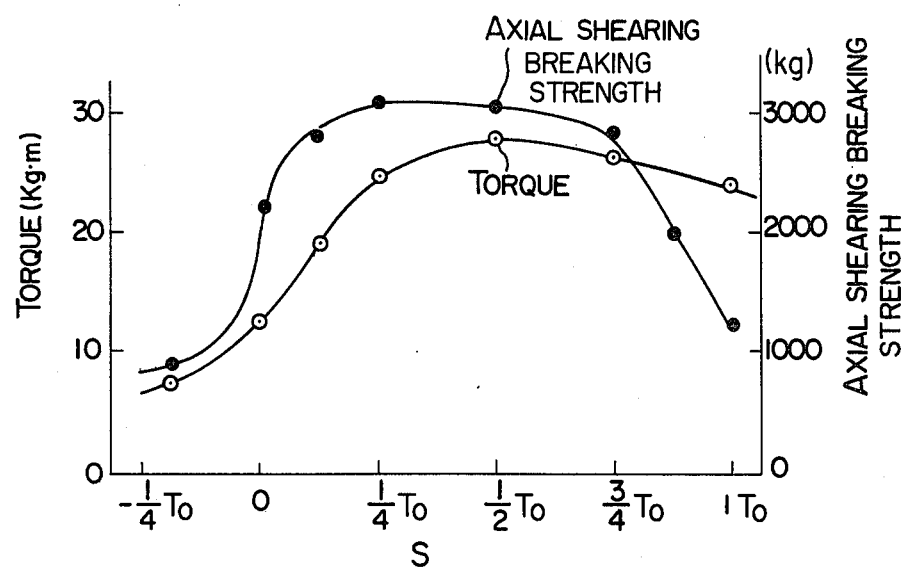

FIG. 8 graphically illustrates how the axial shearing breaking strength of the bond and the torque transmissible by the bond are effected by the ratio of the width To of the space 240 (see FIG. 5) to the distance S between the end surface 31 of the pressing member 30 and the upper ends of the grooves 221b and 222b. It will be seen that a practically acceptable strength is obtained when the distance S falls within a range of:

$$O \leq S \leq \tfrac{2}{3} To$$

The fact that the bond member 223 either does not project from or is kept inwardly of the end faces of the disc plates 221 and 222 advantageously assures an intimate face-to-face engagement between these end faces of the disc plates and the mating surface of the rotor 230 when the disc 220 and rotor 230 are electromagnetically coupled together. Thus, it is recommended that the bond member 223 be pressed in such a manner that the bond member is depressed to form an annular recess in that side of the disc 220 which is directed to and engaged by the rotor 230, as shown in FIG. 1.

From the view point of minimizing the load required for the plastic deformation of the bond material to mechanically bond the disc plates, it is preferred that the width $T_o$ of the space 240 is as small as possible. On the contrary, the width $T_o$ should as large as possible from the view point of assuring an adequate magnetic insulation. For an electromagnetic clutch used in an automobile air conditioner, the width $T_o$ is preferably equal to one half the thickness of the disc plates, i.e., within the range of from 1.5 mm to 6.0 mm.

Figure 9:
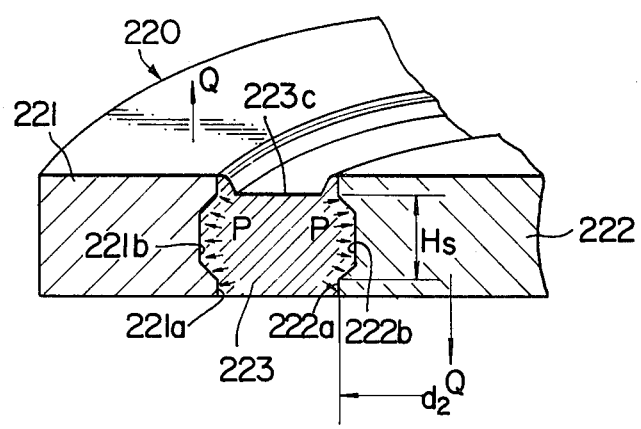

FIG. 9 shows the two disc plates in their bonded conditions. A pressing force P is generated in the bond member 223 to strongly urge the material of the bond member against the grooves 221b and 222b and the surfaces 221a and 222a of the first and second disc plates 221 and 222 so that these disc plates are mechanically bonded together by the bond material 223. In order that this mechanical bonding may be achieved, it is essential that the material or materials of the first and second disc plates 221 and 222 have hardness and stiffness higher than those of the material of the bond member 223, because these disc plates should not be deformed to any appreciable extent (although a slight strain would be acceptable) but withstand the pressure produced during the time while the plastic flow of the material of the bond member 223 is caused by the pressure applied by the pressing member 30. In other words, it is necessary that the material of the bond member 223 has a smaller deformation resistance than those of the first and second disc plates 221 and 222. As an example, in the case where the first and second disc plates are both made of a steel, the bond member may be made of aluminium, brass, copper or the like.

In addition, the bond member 233 itself is required to have predetermined mechanical strengths in respect of shearing, compression, bending and so on. It is needless to say that the levels of these mechanical strengths are determined on the basis of the purpose or application of the electromagnetic clutch.

Figure 10:
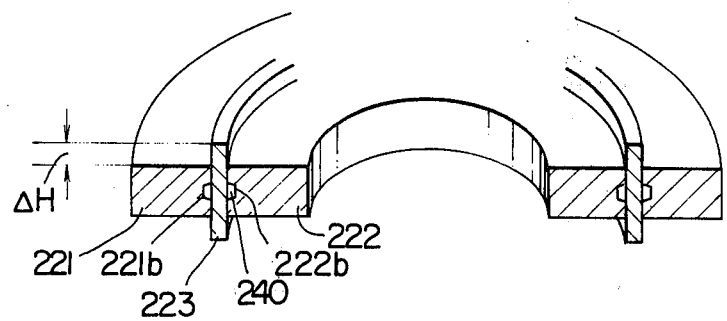
FIGS. 10 to 12 diagrammatically illustrate conditions required for the bond member.
Figure 11:
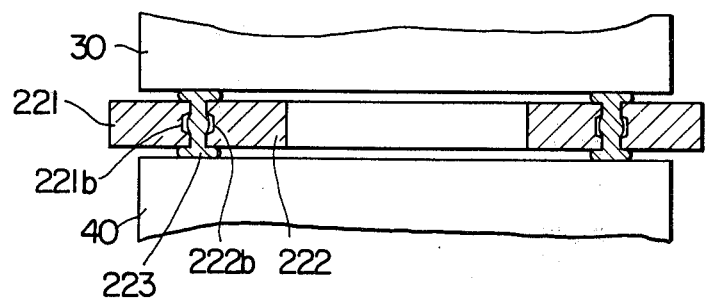
Figure 12:
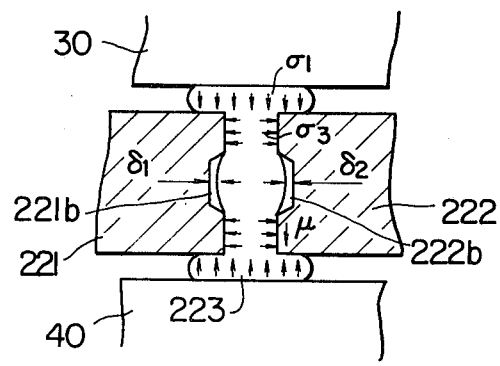

Hereinafter, a description will be made as to the relationship between the height $H_1$ of the bond member 223 and the height $H_o$ of the disc plates. In order to assure that the space 240 between the disc plates 221 and 222 is filled with the material of the bond member 223, the requirement will be satisfied by the use of a bond member which is of a volume at least equal to the volume of the space 240. However, in the case where a bond member 223 having a large difference $\Delta H$ in height as shown in FIG. 10 is used for the bonding, the bond member is deformed at its ends disposed outside the space 240, as shown in FIG. 11. In such a case, therefore, the space 240 is not completely filled with the material of the bond member 223 and gaps or unfilled voids $\delta_1$ and $\delta_2$ are left adjacent to the bottoms of the grooves 221b and 222b, as shown in FIG. 12 even if the bond member 223 used is of the volume greater than that of the space 240.

Figure 13:
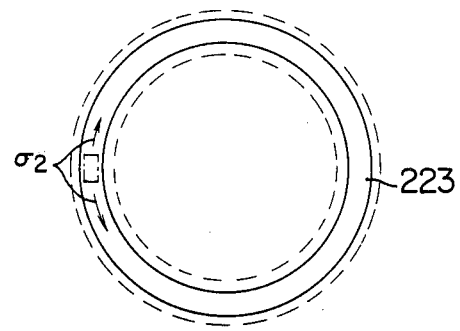
FIGS. 13 and 14 diagrammatically illustrate stresses produced at the time of swaging operation.
Figure 14:
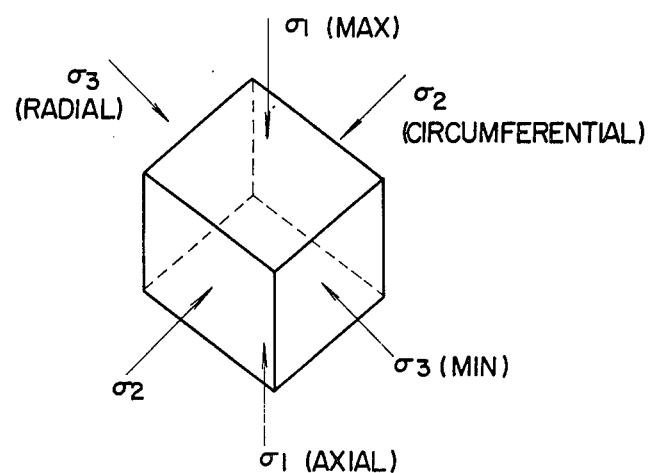

The reasons will be discussed hereunder. When the ring-shaped bond member 223 is pressed in the axial direction as shown in FIG. 11 by means of the pressing member 30 and the anvil 40, there are produced axial stress $\sigma_1$, circumferential stress $\sigma_2$ and radial stress $\sigma_3$ in the bond member 223 (see FIGS. 13 and 14). The axial stress $\sigma_1$ is given by:

$$\sigma_1 = (1 \sim 1.5)Kf \qquad (1)$$

where "Kf" represents the deformation resistance of the bond member 223.

Since the portions of the bond member 223 adjacent to the opposite ends thereof are not radially confined during the pressing operation, the axial stress $\sigma_1$ is maximum while the radial stress $\sigma_3$ is minimum.

Accordingly, the following equation (2) is derived from Tresca Yield Criterion:

$$Kf = \sigma_1 - \sigma_3 \qquad (2)$$

The equations (1) and (2) can be combined to give:

$$\begin{aligned}\sigma_3 &= \sigma_1 - Kf \\ &= (1 \sim 1.5)Kf - Kf \\ &= (0 \sim 0.5)Kf\end{aligned} \qquad \begin{aligned}(2') \\ \\ (3)\end{aligned}$$

The equation (3) shows that, in the bond member 223 shown in FIGS. 10 and 11, there is produced no radial stress high enough to cause a radial plastic deformation of the bond member into the grooves in the disc plates 221 and 222.

On the other hand, according to the method of the present invention illustrated in FIG. 7, the bond member 223 is substantially wholly enclosed and confined by the disc plates 221 and 222 and by the pressing member 30 and the anvil 40 during the pressing operation. With the method of the present invention, therefore, the axial stress $\sigma_1$ is as follows:

$$\sigma_1 = (2 \sim 4)Kf \qquad (4)$$

The equation (4) will be incorporated into the above equation (2') to give:

$$\begin{aligned}\sigma_3 &= (2 \sim 4)Kf - Kf \\ &= (1 \sim 3)Kf\end{aligned} \qquad (5)$$

It will therefore be appreciated that the level of the radial stress $\sigma_3$ is higher than that of the deformation resistance Kf, so that the bond material is caused to flow into and completely fill up the grooves 221b and 222b in the disc plates 221 and 222.

In order that the bond member may be substantially wholly enclosed and confined during a pressing or swaging operation, the requirement is satisfied by a bond member having a height $H_1$ which is equal to or smaller than the height $H_o$ of the space 240. However, if the height of the cross-section of the bond material is too small, it is required that the stroke of the pressing projection 32 of the pressing member 30 be increased to assure a sufficient flow of the bond material into the grooves. Unfortunately, however, there is a practical limit in increasing the stroke of the pressing member 30 because the afore-mentioned angle $\theta'$ cannot be made too small. In deciding the height $H_1$ of the bond member 223, it is necessary that the bond member used is of a volume somewhat smaller than the volume of the space 240 and that various factors such as the width $T_o$ of the space 240 and the angle of inclination $\theta'$ of the side walls of the pressing projection 32 of the pressing member 30 are taken into consideration.

Figure 15:
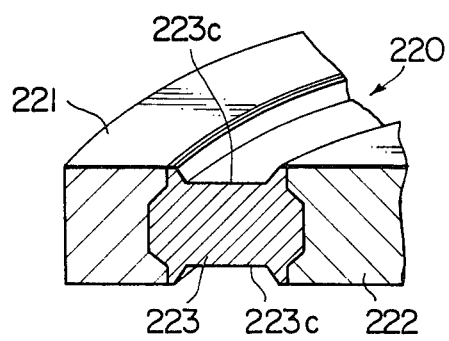
FIG. 15 illustrates a modified bond member which is depressed in the opposite end faces.

FIG. 15 is a partially sectional perspective view of a modification of the disc 220. The modified disc shown in FIG. 15 differs from the disc shown in FIG. 9 in that the opposite end faces of the bond member 223 are depressed to provide annular recessed surfaces or grooves 223c in the opposite end faces of the disc 220.

If a disc plate is thin-walled, the disc plate will be deformed during a pressing operation even if the disc plate is made of a material having a deformation resistance higher than that of the bond material. In such a case, therefore, the material of the bond member cannot be caused to flow to every points of the space. It is, therefore, a general requirement that disc plates to be connected by a mechanical bond have stiffness and strength of more than predetermined levels.

However, there will be a situation where a thin-walled disc plate must be used. In performing a pressing operation to mechanically bond such a thin-walled disc plate 221 to another disc plate 222, the thin-walled plate 221 may advantageously be bucked up by a support 41 which is a part of the anvil 40 and which reliably supports or bucks up the thin-walled plate 221 against deformation, as shown in FIG. 16. If the other disc plate 222 is also thin-walled, a similar support (not shown) can be prepared to similarly back up the plate 222 during a pressing or swaging operation.

FIG. 17 shows in perspective view a ring-shaped bond member 223 having a simple rectangular cross-section. This bond member is made of a non-magnetizable material and prepared by cutting a pipe or cylindrical material, plastic work or sintering.

FIG. 18 is a view similar to FIG. 17 but illustrates another example of the bond member. The bond member 223 shown is also generally ring-shaped having a simple rectangular cross-section, but is circumferentially discontinued by a clearance d. The bond member 223 is formed by bending a rod or wire of a non-magnetizable material into a ring-like form of a predetermined size. The clearance d is dimensioned such that, when the bond member 224 is placed between the disc plates 221 and 222 and then pressed for swaging, the clearance d is made substantially zero (0), namely, the end surfaces of the ring-shaped bond member are brought into close contacting relationship with each other. As a practical example, the outer diameter of the bond member 223 is 54 mm with the clearance d being of about 0.5 mm which corresponds to an angle of about 1°.

Figure 19:
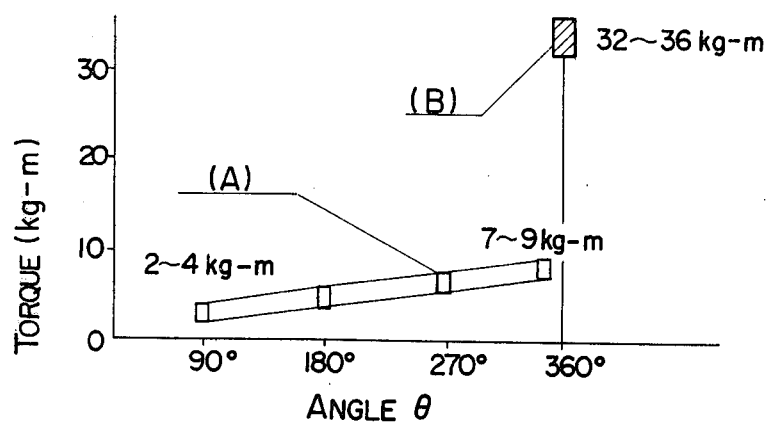
FIG. 19 graphically illustrates results of comparison between the prior art bond structure shown in FIG. 20A and that of the present invention shown in FIG. 20B in respect of the torque transmission performance.
Figure 20A:
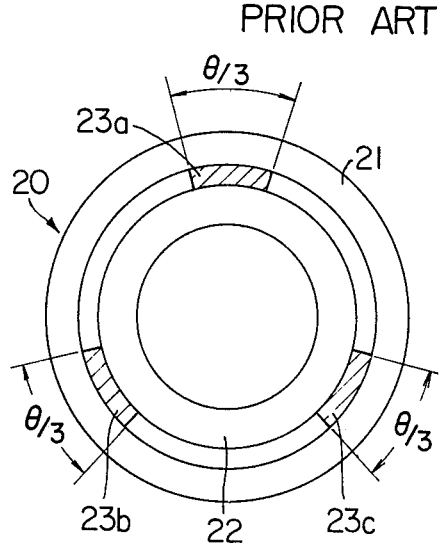
Figure 20B:
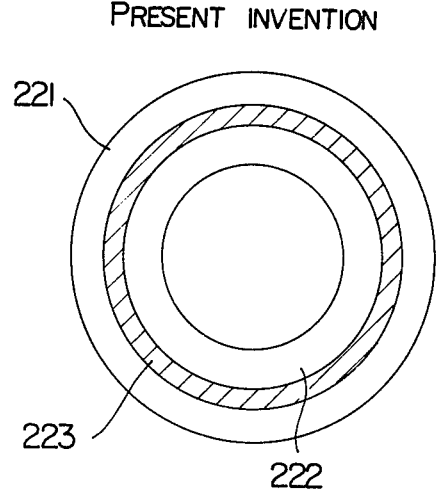

FIG. 19 graphically illustrates the results of test wherein the mechanical bond structure of a prior art disc 20 shown in FIG. 20A was compared with the mechanical bond structure of the disc 220 according to the present invention shown in FIG. 20B. The discs 20 and 220 of the prior art and of the present invention were both of 5 mm in thickness. The prior art disc 20 was formed of outer and inner disc plates 21 and 22 connected by three circumferentially spaced mechanical bond members 23a, 23b and 23c each circumferentially extending an angle of $\theta/3$, whereas the outer and inner disc plates 221 and 222 of the disc 220 according to the present invention were connected by a single mechanical bond member 223 of complete circular shape or ring. The bond members used in the discs of the prior art and of the present invention were all made of brass. The discs were tested in respect of the capability of transmitting torque.

A plurality of samples of the prior art disc 20 were prepared, wherein the angle $\theta$ (which is the total of the angles $\theta/3$ of the three bond members) were varied as 90°, 180°, 270° and 340°. As will be seen in FIG. 19, the increase in the angle $\theta$ from 90° up to 340° did not result in any appreciable increase in the torque transmitted. The torque transmitted with the angle $\theta$ of 340° was as small as only 10 to 25% of the torque (32 to 36 kg-m) transmitted by the disc 220 according to the present invention. This difference will be due to the fact that, with the mechanical bond structure of the prior art shown in FIG. 20A, the bond members 23a to 23c were not circumferentially confined and thus the axial pressure applied to the bond members at the time of swaging operation was relieved circumferentially with resultant decrease in the radial gripping force. This is the reason why the increase in the angle $\theta$ did not result in any appreciable increase in the transmission of torque. The reason will be discussed in more detail. When each of the bond members of the prior art disc 20 is axially pressed, stresses $\sigma_1$, $\sigma_2$ and $\sigma_3$ are produced in the bond member in axial, circumferential and radial directions, respectively. Under the triaxial stress, the material flows in the direction of the minimum stress ($\sigma_2$). As having been discussed above, the deformation resistance Kf of the bond material will be represented by:

$$\sigma_1 = (1 \sim 1.5) Kf \qquad (1)$$

Because any of the bond members is not confined in the circumferential direction, the following equation (3') is derived from the Tresca Yield Criterion:

$$\sigma_3 = (0 \sim 0.5) Kf \qquad (3')$$

The equation (3') shows that the axial pressure exerted does not produce a radial stress which is high enough to cause a plastic flow of the bond material into grooves in the outer and inner disc plates 21 and 22 of the prior art disc 20.

The bond member shown in FIG. 18 and used in the method of the present invention is circumferentially discontinued by the clearance d and thus is not circumferentially confined before the member is pressed. In the initial stage of pressing or swaging operation, however, the bond member is circumferentially expanded or elongated until the clearance d becomes zero (0). Thereafter, the bond member is confined also circumferentially and, as the pressing or swaging operation proceeds further, the radial stress is increased with a resultant increase in the gripping force. Unlike the mechanical bond structure shown in FIG. 20A, therefore, the bond member shown in FIG. 18 can be swaged to form a mechanical bond which provides a torque transmission substantially equal to that obtainable from the completely ring-shaped bond member shown in FIG. 17.

Figure 21:
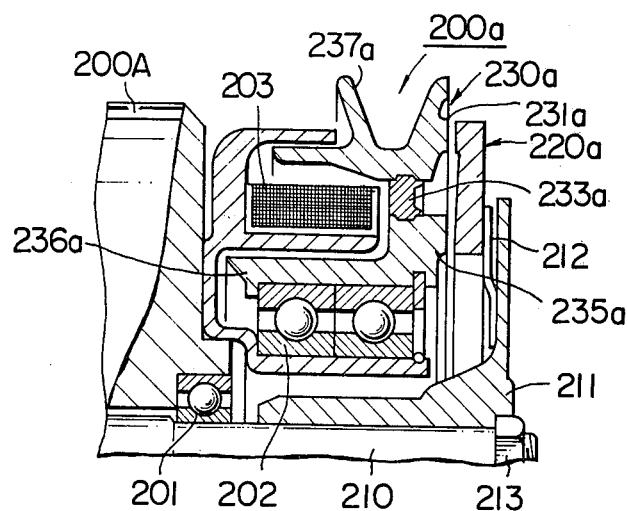
FIGS. 21 and 22 are similar to FIG. 1 but illustrate second and third embodiments of the electromagnetic clutch according to the present invention.

FIG. 21 illustrates a single flux type electromagnetic clutch 200a according to the present invention. Parts similar to those of the preceding embodiment 200 are designated by similar reference numerals. Only the difference will be discussed hereunder. A rotor 230a, which is the driving member in the clutch 200a, comprises first and second annular members or so-called "disc plates" 231a and 235a which are both made of a magnetizable material and mechanically bonded together by a substantially ring-shaped bond member 233a of a non-magnetizable material. A disc 220a, which is the driven member in the clutch 200a, is of a unitary structure formed solely of a magnetizable material.

The primary difference between single and double flux types of electromagnetic clutches is that the driving and driven members of the single flux type clutch are electromagnetically coupled together at two points, one half the points of electromagnetic connection in the double flux type clutch, with a resultant decrease in the force of engagement between the driving and driven members. The clutch of the single flux type, however, needs a reduced number of structural components, has a simplified structure and thus can be economically manufactured.

Also with the single flux type electromagnetic clutch 200a according to the present invention, the leakage of magnetic flux is remarkably reduced and, in addition, superior mechanical stability is assured.

Figure 22:
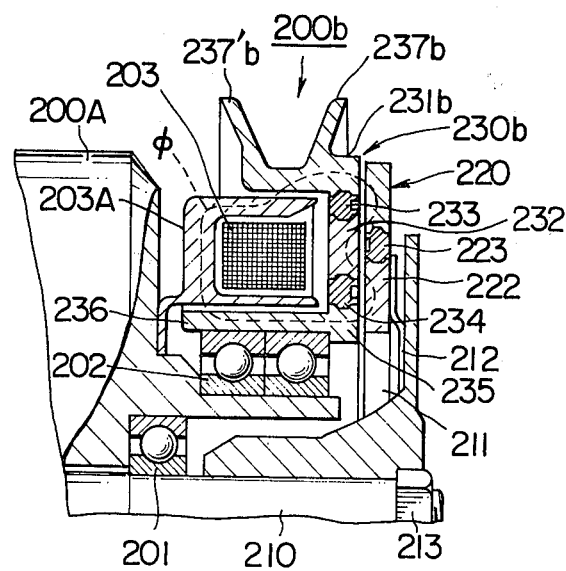

FIG. 22 illustrates a further embodiment 200b which is similar in structure to the embodiment shown in FIG. 1 with the exception that a rotor 230b includes a disc plate 231b which has been fabricated integral with both the right and left side walls 237b and 237'b of the pulley. Because the disc plate 231b can be prepared separately of a disc plate 232, the disc plate 231b can be designed and worked such that it includes the V-shaped pulley as its integral section and mechanically bonded with the disc plate 232 by means of a bond member 233.

What is claimed is:

1. An improved electromagnetic torque transmission clutch including first and second rotatable members disposed in substantially coaxial relationship, said first rotatable member being drivingly connected to a driven member and including a section made of a magnetizable material, said second rotatable member including a section made of a magnetizable material and provided with means for drivingly connecting said second rotatable member to a driving means, and one of said rotatable members being axially movable into face-to-face contact with the other of said rotatable members; means including said sections of said first and second rotatable members for forming a magnetic circuit; and an electromagnetic coil means for generating a magnetic flux passing through said magnetic circuit; wherein at least one of said first and second rotatable members comprises substantially concentric and radially spaced annular members both made of a magnetizable material, said annular members having radially opposed connecting surfaces formed therein with radially opposed annular grooves therein, each of said grooves being defined by a bottom and axially spaced side walls that are each inclined at an angle relative to a plane that is perpendicular to a rotation axis of said transmission clutch and an annular bond member of a non-magnetizable metal swaged into the annular space between said concentric magnetizable members and into said annular grooves to mechanically connect them together and magentically disconnect them from each other whereby said concentric magnetizable members are restrained not only in the radial direction but also in the axial direction, said bond member being formed with an annular recess in that side which is directed to and engaged by the other of the first and second rotatable members.

2. An electromagnetic clutch as defined in claim 1, wherein said first rotatable member comprises a pair of concentric and radially spaced annular members both made of a magnetizable material and an annular bond member of a non-magnetizable metal swaged into the annular space between said pair of annular matnetizable members, and wherein said second rotatable member comprises three substantially concentric and radially spaced annular members all made of a magnetizable material, and annular bond members of a non-magnetizable metal swaged respectively into the annular spaces respectively defined between said three annular magnetizable members, the outermost annular magnetizable member of said second rotatable member being provided with a pulley formed on the outer periphery thereof, said pulley constituting said means for drivingly connecting said second rotatable member to said driving means.

3. An electromagnetic clutch as defined in claim 2, wherein said bond members are formed with annular recessed surfaces in both of opposed end surfaces thereof.

4. An electromagnetic clutch as in claim 1 or 2, wherein the bond member is formed of a material selected from the group consisting of aluminum, brass, and copper.

5. An electromagnetic clutch as defined in claim 1 or 2, wherein the angle of inclination of each of said side walls of each annular groove ranges from 25° to 65°.

* * * * *